April 28, 1931.  H. T. SEELEY  1,803,147
SYNCHRONIZING SYSTEM FOR ALTERNATING CURRENT GENERATORS
Filed July 15, 1929
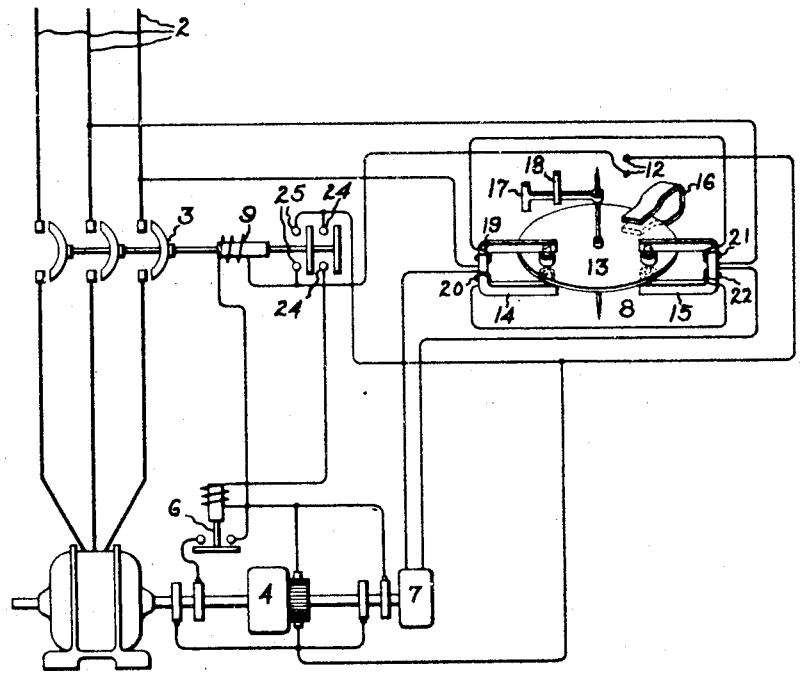
Inventor:
Harold T. Seeley,
by Charles E. Tullar
His Attorney.

Patented Apr. 28, 1931

1,803,147

UNITED STATES PATENT OFFICE

HAROLD T. SEELEY, OF YEADON, LANSDOWNE, PENNSYLVANIA, ASSIGNOR TO GENERAL ELECTRIC COMPANY, A CORPORATION OF NEW YORK

SYNCHRONIZING SYSTEM FOR ALTERNATING-CURRENT GENERATORS

Application filed July 15, 1929. Serial No. 378,318.

My invention relates to synchronizing arrangements for alternating current generators and its object is to provide an improved self-synchronizing arrangement whereby a large generator may be connected to an alternating-current circuit without producing a large disturbance thereon.

My invention will be better understood from the following description when taken in connection with the accompanying drawing which shows diagrammatically an automatic synchronizing arrangement embodying my invention and its scope will be pointed out in the appended claims.

Referring to the drawing, 1 represents a polyphase generator which is adapted to be connected to a polyphase circuit 2 by means of a circuit breaker 3 which may be of any suitable type examples of which are well known in the art. The generator 1 may be driven by any suitable type of prime mover (not shown).

The field winding of the generator 1 is arranged to be supplied with direct current from any suitable source which is shown in the drawing as a direct-connected exciter 4. A field switch 6 is provided for controlling the connection of the generator field winding to the exciter 4.

In accordance with my invention, I provide an improved arrangement for effecting the closing of the circuit breaker 3 between the generator 1 and the circuit 2 in response to a predetermined relation between the speed of the generator 1 and the frequency of the circuit 2. In the embodiment of my invention shown in the drawing, I accomplish this result by direct connecting an auxiliary synchronous generator 7 to the main generator 1 so that the speed of the auxiliary generator is proportional to the speed of the main generator and so that a predetermined relation exists between the voltages of the auxiliary generator 7 and the main generator 1, and providing a suitable automatic synchronizing device 8 which is arranged to complete an energizing circuit for the closing coil 9 of the circuit breaker 3 when the frequency and phase differences between the voltages of the auxiliary generator 7 and the circuit 2 are simultaneously below predetermined values. The particular synchronizing means 8 shown in the drawing comprises an induction disk 13 which has opposing torques exerted thereon by the shaded-pole motor elements 14 and 15. Suitable means such as a drag magnet 16 is provided to exert a retarding force on the disk 13 so that the desired time delay action in the movement of the disk may be obtained. Attached to the disk 13 is a contact member 17 which is arranged to be moved into engagement with stationary contacts 12 when the torque of the motor element 14 exceeds the torque of the motor element 15. When the torque of the motor element 15 exceeds the torque of the motor element 14, the contact member 17 is arranged to be moved into engagement with a stop 18.

The motor element 14 is arranged to be energized by the windings 19 and 20 which are respectively energized in response to the voltages of the circuit 2 and the auxiliary generator 7 and which are so arranged that a torque is exerted on the disk 13 in accordance with the sum of the instantaneous voltages of the generator 7 and the circuit 2 and in a direction to move the contact member 17 into engagement with the contacts 12. The motor element 15 is arranged to be energized by the windings 21 and 22 which are respectively energized in response to the voltages of the circuit 2 and the generator 7 and which are so arranged that a torque is exerted on the disk 13 in accordance with the difference between the instantaneous voltages of the generator 7 and the circuit 2 and in a direction to move the contact member 17 away from the contacts 12. The motor elements 14 and 15 are also constructed so that the torque exerted by the motor element 14 exceeds the torque exerted by the motor element 15 only when the phase difference between the voltages of the generator 7 and circuit 2 is less than a predetermined value. Therefore, due to the retarding effect exerted by the drag magnet 16 it will be observed that only when the frequency difference between the voltages of the generator 7 and the circuit 2 is less than a predetermined value will the torque exerted by the motor element 14 exceed the torque exerted by the motor element 15 for a sufficient length of time to move the contact member 17 into engagement with the contacts 12.

As soon as the circuit breaker 3 closes in response to the operation of the synchronizing device 8, the circuit of the closing coil of the field switch 6 is completed through the auxiliary contacts 24 on the circuit breaker 3, so that the generator field winding is excited to pull the generator into exact synchronism with the circuit 2. The circuit breaker 3, by closing its auxiliary contacts 25, also completes a locking circuit for its closing coil 9 across the exciter 4 so that the coil 9 is energized independently of the position of the contact 17 of the synchronizing device 8 after the circuit breaker 3 closes.

It will be observed, therefore, that in accordance with my improved arrangement, the closing of the circuit breaker 3 takes place only when the rotor of the unexcited generator 1 is in substantially the same position it is in when the generator is operating in synchronism with the circuit 2. Therefore, the closing of the circuit breaker 3 and the subsequent energization of the field winding of the generator 1 produces very little disturbance on the circuit 2 because there is very little movement of the generator rotor required to pull the generator into exact synchronism with the circuit 2 when the generator field circuit is excited.

The operation of the arrangement shown in the drawing is as follows: When it is desired to place the generator 1 in operation, the generator is started and brought up to approximately normal speed. Since the circuit breaker 3 is open, the switch 6 is also opened, and, therefore, the main generator 1 is unexcited. The voltage of the auxiliary generator 7, however, builds up to normal. As soon as the speed of the main generator 1 is such that the desired frequency and phase relation occurs between the voltages of the generator 7 and the circuit 2, the automatic synchronizing device 8 closes its contacts 12 and connects the closing coil 9 of the circuit breaker 3 across the exciter 4 so that the unexcited generator 1 is connected across the circuit 2. The circuit breaker 3 by closing its contacts 25 completes, independently of the contact 12 of the synchronizing device 8, a locking circuit for the closing coil 9.

The circuit breaker 3 by closing its auxiliary contacts 24, completes across the exciter 4 an energizing circuit for the operating coil of the field switch 6 so that the field winding of the generator 1 is excited to pull the generator 1 into exact synchronism with the circuit 1.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States is:

1. In a synchronizing arrangement, a synchronous generator, an alternating current circuit, and means responsive to a predetermined relation between the speed of said generator and the frequency of said circuit for effecting the connection of the generator to the circuit with the generator field winding unexcited and the subsequent excitation of the generator field winding.

2. In a synchronizing arrangement, a synchronous generator, an alternating current circuit, and means responsive to a predetermined relation between the speed of said generator and the frequency of said circuit for effecting the connection of the generator to the circuit with the generator field winding unexcited, a source of direct current, and means responsive to the connection of said unexcited generator to said circuit for effecting the connection of said source to the generator field winding.

3. In a synchronizing arrangement, an alternating current circuit, a main alternating current generator, an auxiliary alternating current generator driven at a speed proportional to the speed of said main generator, and arranged to generate a voltage having a predetermined phase relation to the voltage of the main generator, and means responsive to a predetermined phase relation between the voltages of said circuit and auxiliary generator for connecting said main generator to said circuit with the field winding of said main generator unexcited and for subsequently effecting the excitation of said field winding.

4. In a synchronizing arrangement, an alternating current circuit, a main generator having an unexcited field winding, an auxiliary synchronous generator direct connected to said main generator, means responsive to a predetermined relation between the phases of the voltages of said circuit and said auxiliary generator for effecting the connection of said main generator to said circuit, a source of direct current, and means responsive to the connection of said main generator to said circuit for effecting the connection of said source to the field winding of said main generator.

In witness whereof, I have hereunto set my hand this 11th day of July, 1929.

HAROLD T. SEELEY.